Sept. 1, 1959 D. M. KNOX 2,901,850
PICTURE HOLDER
Filed July 18, 1957 4 Sheets-Sheet 1
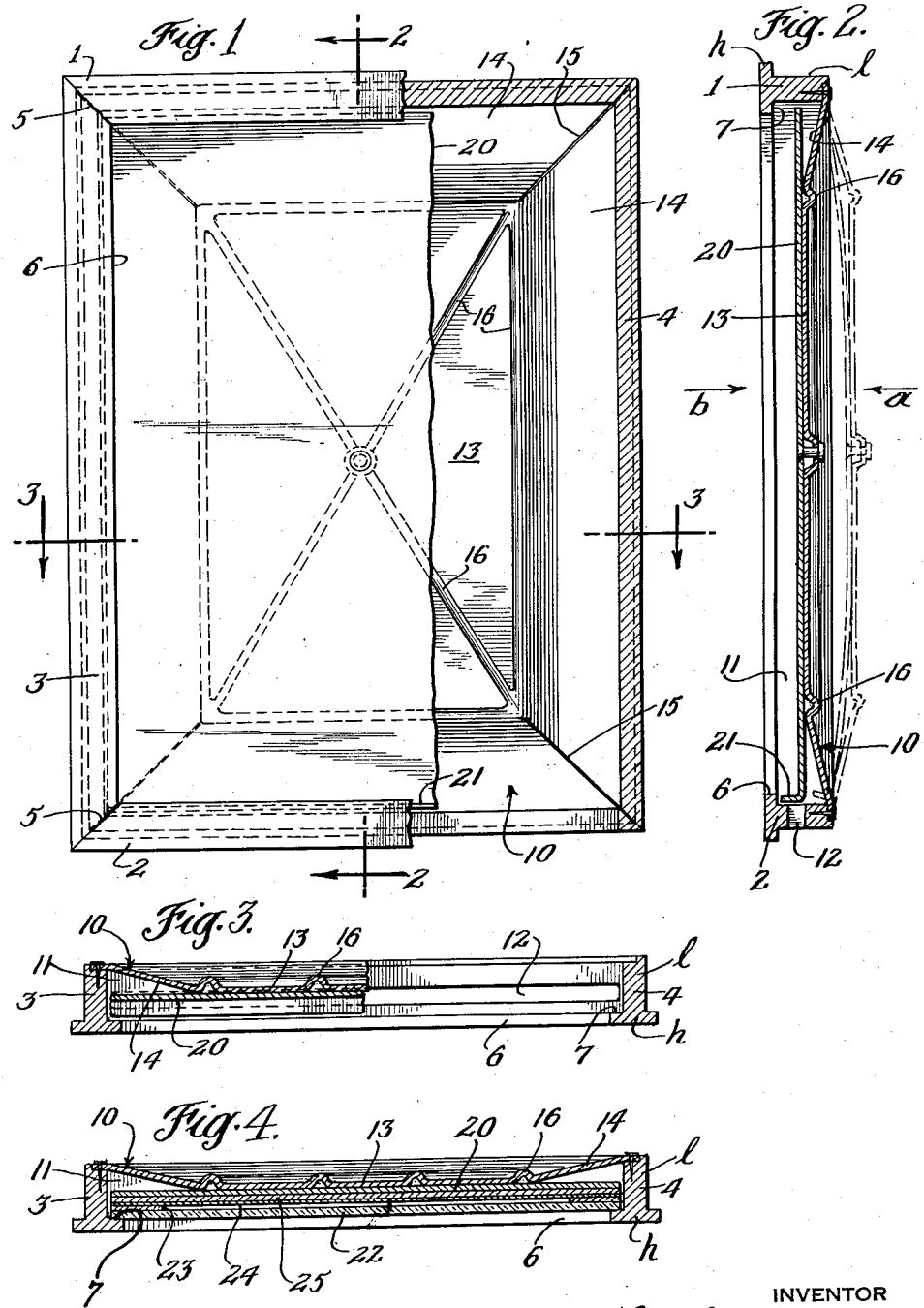
INVENTOR
David M. Knox
BY
Synnestvedt & Lechner
ATTORNEYS

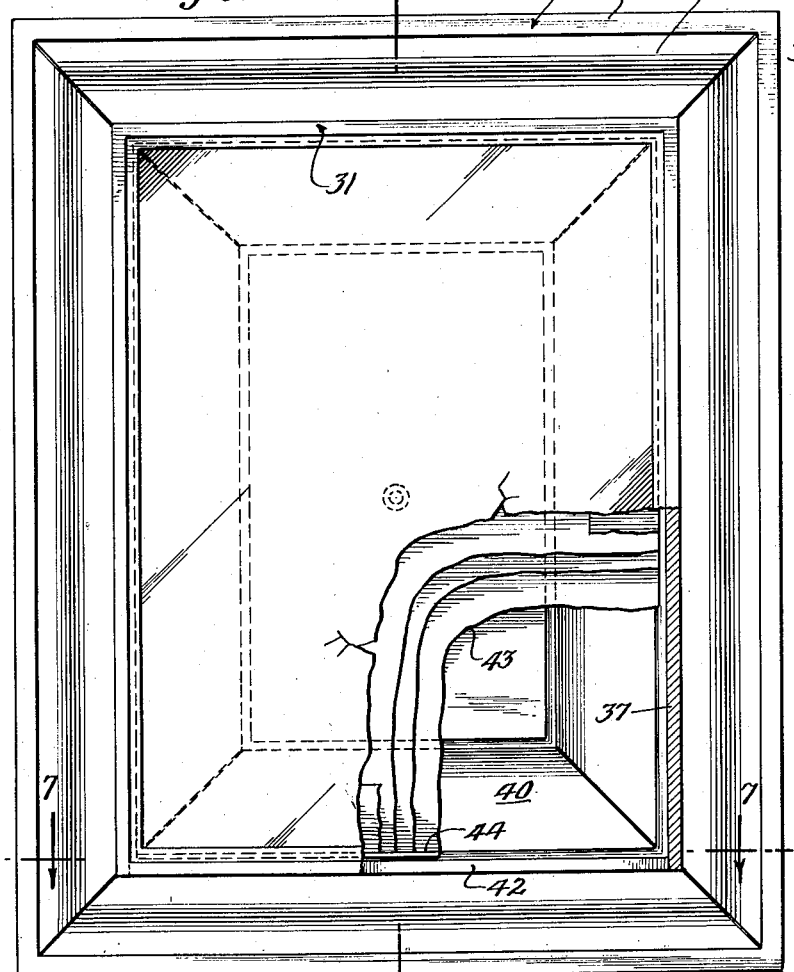
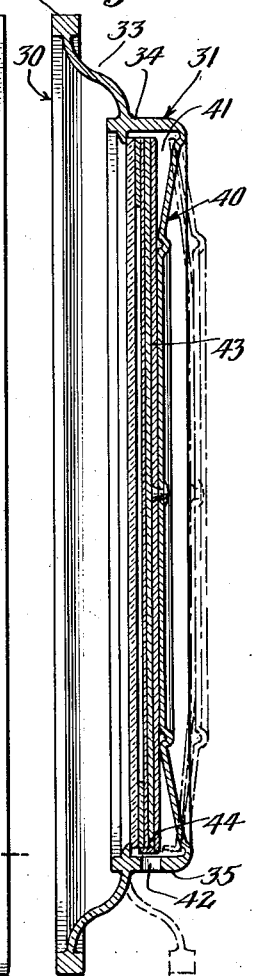
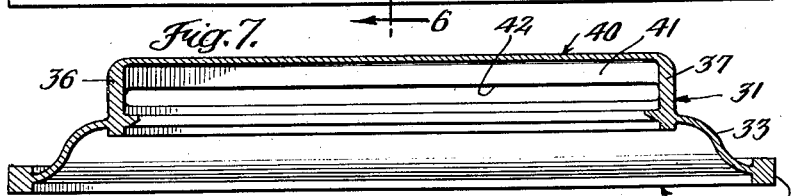
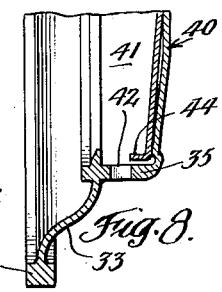
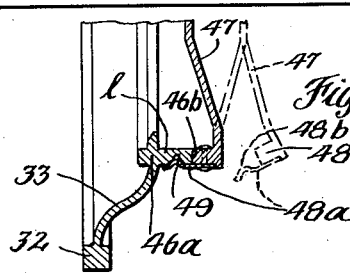

Sept. 1, 1959   D. M. KNOX   2,901,850
PICTURE HOLDER
Filed July 18, 1957   4 Sheets-Sheet 3
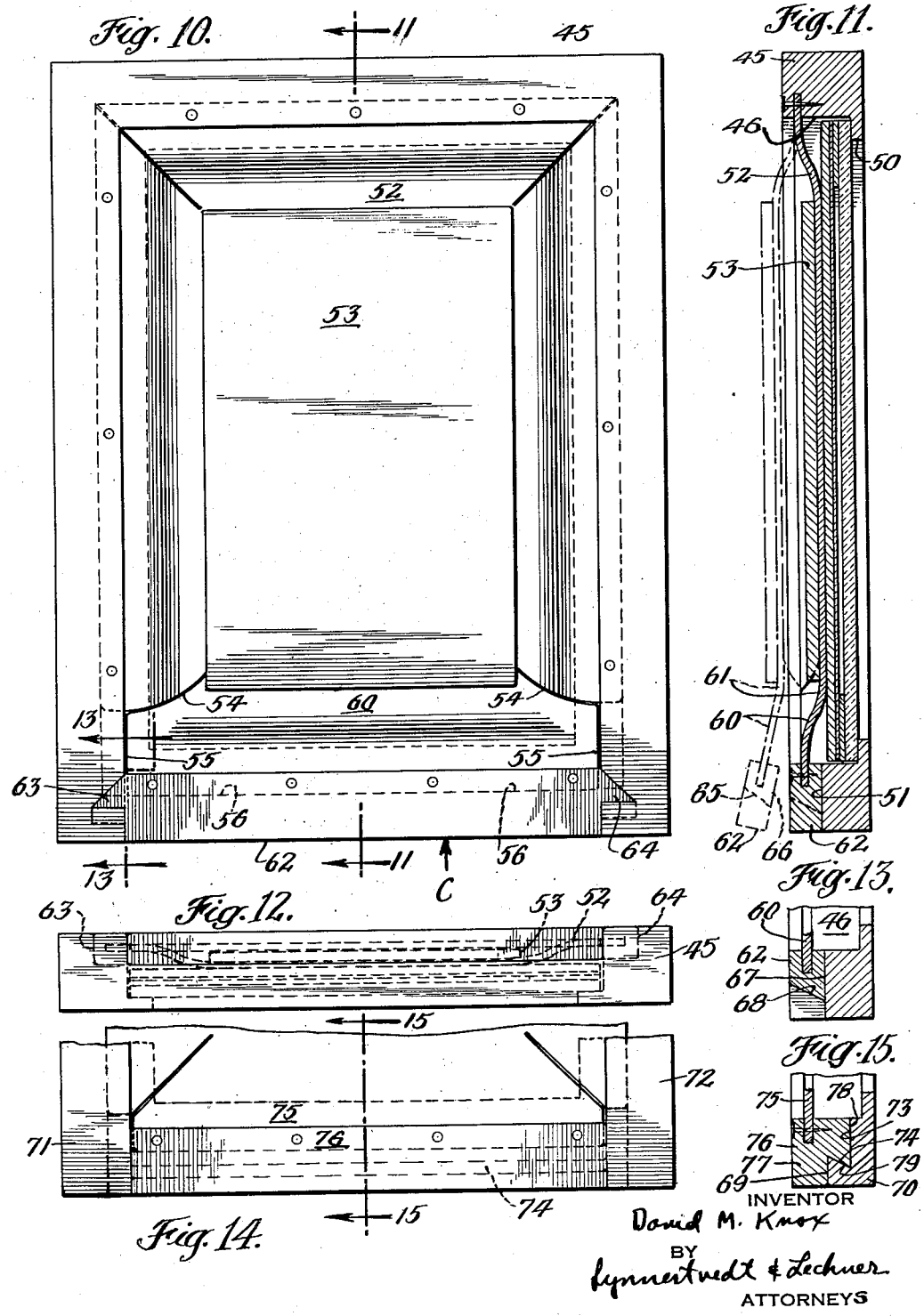
INVENTOR
David M. Knox
BY
Lynnertvedt & Lechner
ATTORNEYS Sept. 1, 1959 D. M. KNOX 2,901,850
PICTURE HOLDER
Filed July 18, 1957 4 Sheets-Sheet 4
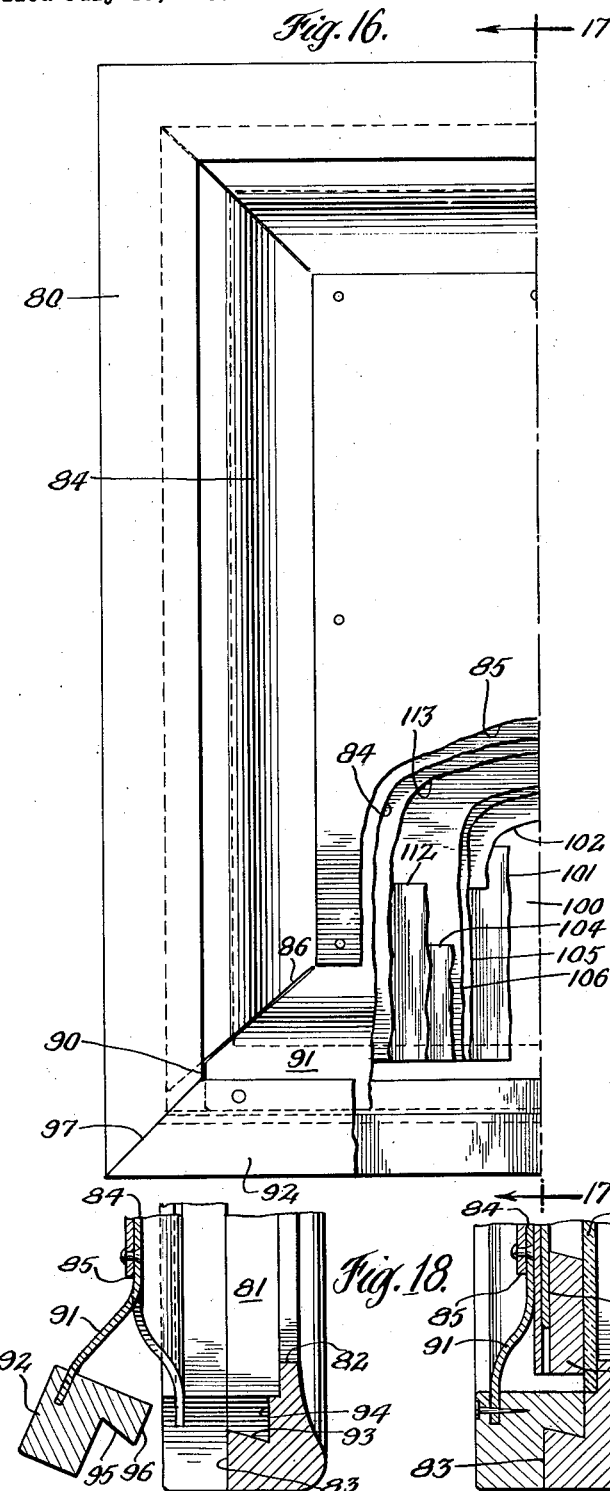
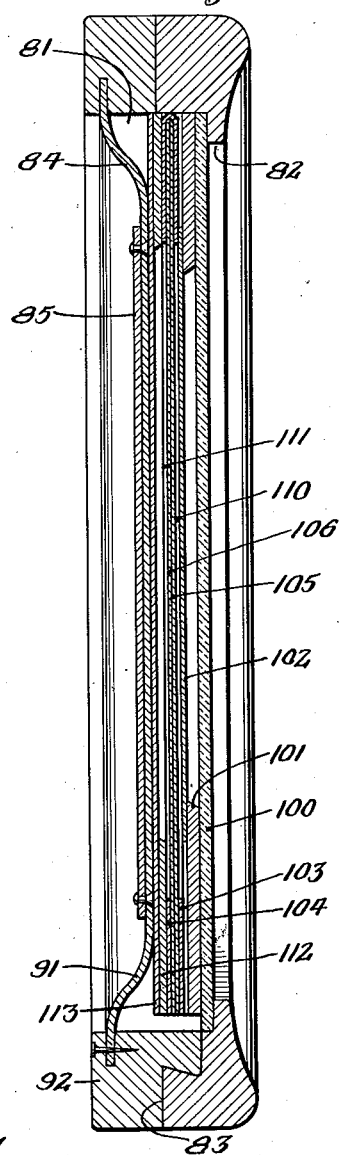
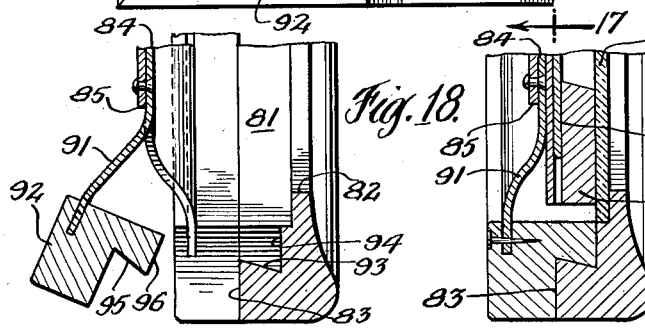
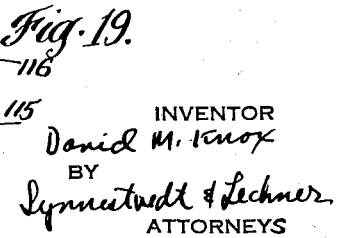
INVENTOR
David M. Knox
BY
Lynnewtwedt & Lechner
ATTORNEYS United States Patent Office 2,901,850
Patented Sept. 1, 1959

2,901,850
PICTURE HOLDER
David M. Knox, New York, N.Y.
Application July 18, 1957, Serial No. 672,765
8 Claims. (Cl. 40—152)

This invention relates to devices for supporting pictures or the like and in particular relates to a novel picture holder with a picture-mounting chamber and having resilient means providing for the holding and/or releasing of a picture therein and for quick access to the chamber for the withdrawal and insertion of the picture.

In one aspect the invention contemplates a holder having a picture-carrying chamber formed with a resilient member depressible into the chamber for the purpose of interengaging and holding a picture.

In another aspect the invention contemplates a holder having a picture-carrying chamber formed with a resilient member depressible into the chamber for interengaging and holding a picture and formed with means providing for quick access to the chamber.

In another aspect the invention contemplates a holder having a picture-carrying chamber formed with a viewing aperture and with a resilient backing member movable toward and away from the aperture for holding or releasing a picture in the chamber together with means providing for quick access to the chamber for the withdrawal or the insertion of a picture.

In still another aspect the invention contemplates a holder for pictures or the like having a deep chamber which can hold a picture in viewing condition together with other pictures in storage condition and ready for viewing and means providing a quick and convenient access means to said chamber.

In another aspect the invention contemplates a holder for pictures which is adapted to store a plurality of pictures in readiness for viewing and which is provided with means providing for the quick change of a picture from the storage condition to viewing condition.

In still another aspect the invention contemplates a holder for pictures or the like having a picture-carrying chamber together with a resilient backing member movable to a position to exert a force for holding a picture in the chamber and formed with a movable flap providing access means to said chamber.

In still another aspect the invention contemplates a holder for pictures or the like having a picture-carrying chamber having a slot for exit and entry of a picture to and from the chamber together with means forming part of the chamber and movable to a position in the chamber to hold a picture and to cover said slot.

In still another aspect the invention contemplates a holder for pictures or the like having a picture-carrying chamber with a slot providing entry and exit means for a picture to and from the chamber together with a resilient backing member movable to a position to exert a force for holding a picture in the chamber and formed with a movable flap providing a closure means for the slot.

In still another aspect the invention contemplates a picture holder having a picture-carrying chamber, one part of which is formed with a resilient backing member generally in the form of a truncated pyramid and capable of moving into or out of the chamber whereby to provide for the holding or freeing of the picture in the chamber.

In still another aspect the invention contemplates a picture holder having a picture-carrying chamber, one part of which is formed with a resilient member shaped to be movable into or out of the chamber whereby to hold or free the picture therein, the chamber being provided with an access slot which is opened or closed by means provided on the backing member.

In still another aspect the invention contemplates a picture holder having a picture-carrying chamber, one part of which is formed with a curved backing member projecting into the same together with a resilient chamber access flap movable to position to open and close the chamber and having substantially the same curved contour as said backing member when in closed position.

A preferred form of the invention is disclosed in the specification to follow taken in conjunction with the drawings wherein:

Figure 1 is a front elevation view, partially broken away, of a holder constructed in accordance with the invention having the resilient backing member projecting into the chamber but with the picture, mat, etc., removed;

Figure 2 is a vertical section on line 2—2 of Figure 1 and illustrates in particular how the chamber is closed with the resilient member projected into the chamber;

Fig. 3 is a plan section on line 3—3 of Figure 1;

Figure 4 is a plan section on line 3—3 of Figure 1, but with the picture, mat, etc., within the chamber;

Figure 5 is a front elevation view of a holder constructed in accordance with the invention having the glass, picture, mat, etc., in place and in contact with the resilient backing member; in particular the view illustrates how the holder may be adapted in an ensemble type display;

Figure 6 is a vertical section taken on line 6—6 of Figure 5;

Figure 7 is a plan section on line 7—7 of Figure 5;

Figure 8 is a fragmentary section illustrating how the chamber is opened when the resilient back member is in a position to be out of the chamber;

Figure 9 is a fragmentary section of the holder of Figure 5 and illustrates how the chamber access flap is held in its chamber closing position;

Figure 10 is a back view of a modified holder constructed in accordance with the invention and illustrates in particular a chamber access flap in its chamber closing position;

Figure 11 is a vertical section taken on line 11—11 of Figure 10 and illustrates in particular a wedging arrangement for securing the chamber access flap in its chamber closing position;

Figure 12 is a bottom view of Figure 10;

Figure 13 is a fragmentary section on the line 13—13 of Figure 10;

Figure 14 is a back view of a modified holder somewhat similar to that shown in Figure 10 and illustrates in particular a chamber access flap in its chamber closing position;

Figure 15 is a fragmentary section taken on line 15—15 of Figure 14 and illustrates a wedging arrangement for securing the chamber access flap in the chamber closing position;

Figure 16 is a one-half rear view of a modified holder constructed in accordance with the invention and illustrates in partciular how the holder of the invention is adapted to mount a picture in viewing poistion and a plurality of pictures in storage position;

Figure 17 is a vertical section taken on the line 17—17 of Figure 16;

Figure 18 is a fragmentary section showing the chamber access flap in open position; and Figure 19 is a fragmentary section illustrating the manner in which mats of different thicknesses can be used in the holder.

In general the holder of the invention has a frame provided with a chamber for holding the picture and its supporting material such as glass, matting, backing, etc. On the front of the frame is an aperture which is covered by the glass through which the picture is viewed. The depth of the chamber is such that the picture and its supporting material can be moved back and forth toward and away from the aperture. On the back of the frame is a resilient member which is shaped generally in the form of a truncated pyramid, the base or wide part of the pyramid being secured to the frame. With the member being flexible, the flat of the pyramid is capable of being moved into and out of the chamber to engage or disengage the supporting material. When in engagement, the force exerted by the resilient member pushes the supporting material and picture up against the glass which is in turn forced against a lip formed around the viewing aperture so that the picture is held steady in the holder. When it is desired to release the picture, pressure is exerted on the glass so that the glass, picture, matting, etc., and resilient member move toward the rear or until the resilient backing member is in a position generally removed from the chamber. The picture, mat, etc., are then free in the chamber for removal. For this latter purpose the invention contemplates means providing for quick access to the chamber, for example, a catch or flap on the resilient member which will open and close a slot on the frame or provide opening clearance between the resilient member and the frame.

Removing the picture from the chamber is independent of the use of nails, screws or other permanent fastening devices and this, of course, makes possible the changing of pictures for display a simple and easy process. Thus, the holder provides great flexibility in the display of pictures and this is of advantage to the user in enabling change to fit decorating or color schemes and for easy change for the display of many different favorite pictures.

In the holder the resilient backing member and the depth of the chamber are arranged so that picture supporting assemblies of differing thicknesses can be placed in the chamber with the backing member exerting a holding force on any of such assemblies. This arrangement is of advantage from the standpoint of flexibility of display and permits the storage of different mats and pictures in the chamber. For example, a variety of mats of differing thicknesses or window openings can be stored in the chamber and thus the setting of the picture can be quickly changed simply by changing the type of mat. In addition, the chamber is capable of holding a plurality of pictures, one in viewing position and the others in storage position, along with a plurality of mats. Thus, pictures having the same artistic theme can be stored together ready for viewing and the setting of any picture selected for viewing can be desirably arranged by the selection of a particular type mat.

In Figures 1 through 4 the holder includes a frame comprising upper molding member 1, bottom molding member 2 and side molding members 3 and 4 which are joined together at mitered joints indicated at 5. Each of the molding members are generally T-shaped in cross-section having leg portions $l$ and head portions $h$. The molding members are arranged so as to form a picture viewing aperture 6, the inner sides of the heads $h$ forming a lip 7 around the aperture. On the leg portions $l$ of the molding members is secured a backing member 10 which is spaced from the head portions $h$ of the molding members so as to form a picture-carrying chamber 11. The backing member is of resilient construction so as to be movable toward and away from the aperture or in and out of the chamber, for example, as between the positions shown in the full and dotted lines in Figure 2. The position shown in full lines will be referred to hereinafter as the closed position, and the position shown in dotted lines will be referred to as the open position. The backing member is moved to the positions shown by pushing either from the direction indicated by the arrow $a$ or the direction indicated by arrow $b$. The bottom molding member 2 is provided with a transversely extending slot 12 which (together with a slot covering device on the resilient backing member) provides entry and exit means to and from said chamber.

Referring again to the backing member 10, this is made from a resilient material such as polyethylene plastic and is cast or molded so that its initial shape is that indicated by the closed position of Figure 2. It will be apparent that the backing member is generally in the form of a truncated pyramid having a flat indicated at 13 and sides indicated at 14, the open mouth or wide end of the pyramid being connected to the frame. In certain instances I have found it desirable to provide slits in the sides 14 as indicated at 15 which assist in accommodating the movement of the backing member as between the closed and open positions. In making the backing member it is preferable that the flat 13 be provided with ribs as indicated at 16.

On the chamber side of the backing member is secured a plate 20 which is preferably made from some lightweight metal having spring-like characteristics. The plate has a foot or catch 21 extending along in the same direction as the slot 12, and it will be seen that when the backing member is in closed position the foot covers the slot; whereas in the open position the foot uncovers the slot.

The purpose of the plate 20 and the ribs 16 is to make a firm or stiff support so that when the backing member contacts the picture supporting material in the chamber, the force exerted will be more or less uniformly distributed. In addition, it might be noted here that the flat of the backing member and the plate 20 can serve as a base for the attachment of means to mount the holder on a table or desk or for hanging from a wall.

In Figure 4 I have shown the holder with the picture and its supporting material including the glass, mat, etc., in the chamber and with the backing member in closed position, and the following procedure is used to mount a picture and supporting material in the holder. First, the backing member is moved to the open position and then a piece of glass 22, a mat 23, a picture 24 and a piece of corrugated or cardboard paper 25 are serially inserted through the slot 12 (Fig. 2). These elements are moved slightly away from the slot and then the backing member is moved to closed position. The plate 20 contacts the corrugated paper and presses the paper, mat and picture up against the glass which is in turn forced against the lip 7. With the backing member in closed position the foot 21 covers the slot 12.

As will be apparent from the above, the holder, as described, was made up of several component parts appropriately fastened together. In certain instances I have found it desirable to make the holder as a unitary piece, for example, being molded or cast from plastic. Such a holder has the same general structure as that described above and can be used as an independent means for supporting a picture. Alternatively, I found it desirable in certain instances to form such a holder in an ensemble type display. This construction is shown in Figures 5 through 8.

The outer framing is generally designated by the numeral 30 and the holder by the numeral 31. The outer framing 30 is constructed similarly to that described in my copending application 672,760 entitled "Ensemble for Pictures and the Like" and filed July 18, 1957, now Patent No. 2,888,764, and includes in an outer frame 32 a deformable section 33 which is interconnected with the holder 31. As best seen in Figure 6, the deformable section provides for the framing to be movable as between the positions indicated by the full and dotted lines. The holder 31 is constructed similarly to the holder described in connection with Figures 1 through 4 having a top molding member 34, a bottom molding member 35 and side molding members 36 and 37 which are all integral with each other. Integral with the molding members is a backing member 40 which is movable as between the open and closed positions indicated by the full and dotted lines of Figure 6. Chamber 41 has a slot 42 formed in bottom molding member 35. The plate 43 is not cast with the assembly, but is attached to the backing member 40 after the assembly is made. The plate is provided with a foot or catch 44 which opens and closes the slot 42, depending upon the position of the backing member.

The glass, mat, picture, etc., are put into the chamber in a manner similar to that described in connection with Figures 1 through 4 and the backing member 40 holds these elements in firm position in the chamber when moved to closed position.

The holder of the invention shown in Figures 10 through 15 is along the lines of the holders described above and illustrates the chamber access means in the form of a flap movable to open or close the chamber and which is held in its closure position by the resiliency of the backing member causing two surfaces to be in engagement as disclosed in my copending application 672,779 entitled "Holder for Pictures" and filed July 18, 1957, now Patent No. 2,888,765.

As seen in Figure 10, the holder includes a frame 45 made up of suitable molding members which form a chamber 46 having picture viewing aperture 50 and a recess 51 which is formed in the bottom of the frame. Also included is a resilient backing member 52 which is movable as between the open and closed positions indicated by the full and dotted lines. On the outer side of the backing member is secured a plate 53 which, in an indirect way, serves the same purpose as the plate 20 described above. As best seen in Figure 10, each side of the resilient backing member 52 is cut at a point beginning at the plate 53 and continuing out at 54 towards the frame and thence down at 55 parallel to the frame and then inwardly toward the center as indicated at 56. The cutting of the resilient member as described forms a flap 60. With the flap being made of resilient material, the area of interconnection at 61 is flexible and therefore provides for the flap to be movable in the sense of being pivotable and swingable about the area 61. On the bottom of the flap 60 is secured a catch 62. The catch 62 is shaped so as to fit into the recess 51 and at opposite ends has ears 63 and 64 which have wedge-shaped portions mating with wedge-shaped portions on the frame, for example, on ear 63 the portion formed by adjacent surfacing 65 and 66 and on the frame the wedge-shaped portion formed by surfacing 67 and 68. From an inspection of Figure 11 it will be seen that when the resilient member is in the closed position, the tendency for the flap 60 to straighten will push the wedge-shaped portions or surfaces firm against each other. Thus, the flap is held in place and the chamber is closed. In this regard, it might be observed here (see Figures 11 and 12) that the flap and the corresponding portions of the backing member have the same cross sectional contour. This is important because it ensures that there is no open space between the flap and backing member in the area along the slits 54. This contributes to the holder being dust proof.

To open the chamber it is only necessary to exert pressure on the glass to move the resilient member to the open position and then pressure is exerted on the catch 62 in the direction indicated by arrow c. This releases the catch so that the flap moves into the position indicated by the dotted lines in Figure 11. To close the chamber, the flap is moved so that the catch is loosely in the slot and then the resilient backing member is moved to closed position and the catch will be moved into the full line position of Figure 11.

In Figures 14 and 15 I have shown another manner by which the flap of the resilient member can be retained in place by a wedging action. In this embodiment a recess 69 is formed in the bottom molding member 70 and extends between the side molding members 71 and 72. Also formed on the bottom molding member 70 are wedge-shaped surfaces 73 and 74. The flap 75 has a catch 76 provided with a portion 77 which is adapted to fit into the recess 69 together with wedge-shaped surfacing 78 and 79 mating with wedge-shaped surfacing 73 and 74 on the frame. The catch 76 and flap 75 are manipulated in the same manner as catch 62 and flap 60 to open and close the chamber. Also the catch is retained in its closure position in a manner similar to that described above, i.e., the resilient flap pushes the mating wedge-shaped surfaces together.

In Figure 9 I have illustrated an alternative arrangement for releasably securing the chamber access flap in closure position. In this instance the bottom molding member 46a is provided with a recess 46b which extends along the edge of the leg portion l and the flap 47 has a catch 48 mounting a clip 48a. When the flap is in the in position indicated by the full lines, the catch 48 is disposed in the recess 46b and the curved surface 48b on the clip is fast in a groove or correspondingly curved surface 49 provided on the lower molding member 46a.

The holder shown in Figures 16 through 19 illustrates the adaptability of the invention for wide variety and great flexibility for the mounting of pictures. In the holder about to be described, the chamber is made of considerable depth so as to be capable of holding a plurality of mats and pictures, the idea being for the display of a single picture with others in ready reserve for display and the mats having different viewing openings and/or thicknesses so as to be desirably coordinated with the particular picture display.

The holder comprises a frame 80 formed with a chamber 81 having a viewing aperture 82 and a recess 83 formed along the bottom. A resilient backing member 84 having a plate 85 is secured to the frame. The backing member is movable between open and closed positions as in the manner already described. Each side of the backing member is cut (as indicated for the left side in Figure 16) along the lines 86 and 90 to form a flap 91 to which is attached a catch 92. The catch is adapted to fit into the recess 83 and is held therein by wedging means similar to that described in connection with Figures 10 through 14, this being illustrated in Figure 18 showing the wedge-shaped surfaces 93 and 94 on the frame and the wedge-shaped surfaces 95 and 96 on the catch. The catch is slightly different from that shown in Figure 14 in that the ends, instead of running parallel to the frame, are mitered as indicated at 97.

Figure 17 illustrates a typical assembly of mats and pictures in the chamber which provide for the flexibility of mounting mentioned above. In that figure the numeral 100 represents a glass covering the viewing aperture; 101 represents a first mat firm against the glass; and 102 represents a picture which may be taped or glued to the mat. The numerals 103 and 104 represent opposite faces of an envelope containing pictures 105 and 106 which are mounted back to back in the envelope. The numerals 110 and 111 represent windows or viewing apertures in the faces of the envelope. The numeral 112 represents a mat of smaller thickness than the mat 101 and having a different size window opening. This mat is up against cardboard backing 113.

It will be apparent that the above assembly provides for quick display of any of the pictures, for example, the mats 101 and 112 can be reversed in position so that the picture 105 can be seen, or the envelope can be reversed in position so that the picture 106 is displayed.

Figure 19 illustrates how different viewing effects for the picture can be obtained by varying the thickness of the mat; for example, in this figure the mat 115 is of much greater thickness than either of the mats 101 or 112 shown in Figure 17. Thus the setting of the picture or its distance from the glass 117 can be varied to suit the tastes of the decorator.

Before closing, it is pointed out that the holders described can be made for use in an ensemble wherein the holder is detachable, for example, as disclosed in my Patent 2,735,205 or in my copending application 672,760, now Patent No. 2,888,764.

I claim:

1. A holder for pictures or the like including a frame formed with a chamber having a viewing aperture and adapted to hold a picture in viewing position and a plurality of pictures in storage position; a resilient backing member disposed on said frame in a position opposite said aperture, the backing member being in the form of a truncated pyramid with the base being secured to the frame and the resiliency of the backing member providing for the flat of the pyramid to be movable into the chamber and exert a force for holding a picture and movable out of said chamber to relieve said force; a flap on said backing member movable to a position relative to said frame to open said chamber and movable to a position in interengagement with said frame to close said chamber and thereby providing access means for the chamber; and means to releasably hold said flap when in closure position.

2. A holder for pictures or the like comprising; a frame formed with a chamber having a viewing aperture; a resilient backing member on said frame disposed in a position opposite said aperture, the backing member being in the form of a truncated pyramid with the base being secured to the frame and the resiliency of the backing member providing for the flat of the pyramid to be movable into said chamber and exert a force for holding a picture therein and movable out of said chamber to relieve said force; a flap on said backing member movable to a position in interengagement with said frame to close said chamber and movable to a position relative to said frame to open said chamber; and thereby providing access means for the chamber; and means to releasably retain the flap in the closure position including engaging surfaces on said frame and on said flap.

3. A holder for pictures or the like comprising: a frame formed with a chamber having a viewing aperture; a portion of the frame being formed with a slot providing entry and exit means for a picture to and from said chamber; a resilient backing member disposed on said frame in a position opposite said aperture, the backing member being in the form of a truncated pyramid with the base being secured to the frame and the resiliency of the backing member providing for the flat of the pyramid to be movable into said chamber and exert a force for holding a picture therein and movable out of said chamber to relieve said force; and means on said backing member covering said slot when the backing member is in said position.

4. A holder for pictures or the like comprising: a frame formed with a chamber having a viewing aperture, a portion of the frame being formed with a slot providing entry and exit means for a picture to and from said chamber; a resilient backing member disposed on the frame in a position opposite said aperture, the backing member being in the form of a truncated pyramid with the base being secured to the frame and the resiliency of the backing member providing for the flat of the pyramid to be movable into said chamber and exert a force for holding a picture therein and movable out of said chamber to relieve said force; and a plate connected with said resilient member and having a portion covering said slot when the backing member is in said position.

5. A holder for pictures or the like comprising: a frame formed with a chamber having a viewing aperture, a portion of the frame being formed with a slot providing entry and exit means for a picture to and from said chamber; a resilient backing member disposed on said frame in a position opposite said aperture and being formed in the shape of a truncated pyramid connected at its wide end with said frame and movable to a position wherein the flat of the backing member extends into said chamber to exert a force for holding a picture therein and movable to a position wherein the flat extends out of said chamber to relieve said force; and means on said member covering said slot when the backing member is in said position.

6. A holder for pictures or the like comprising: a frame formed with a picture-carrying chamber having a viewing aperture and with a recess providing entry and exit means for a picture to and from said chamber; a resilient backing member disposed on the frame in a position opposite said aperture, the backing member being in the form of a truncated pyramid with the base being secured to the frame and the resiliency of the backing member providing for the flat of the pyramid to be movable into said chamber and exert a force for holding a picture therein and movable out of said chamber to relieve said force; a flap formed on said resilient backing member; a catch on said flap adapted to removably fit into said recess; and locking means for securing the catch when in said recess comprising wedge-shaped surfacing on the frame and corresponding wedge-shaped surfacing on the catch and the resiliency of said flap operating to force said surfaces together when the resilient member extends into said chamber.

7. A picture holder comprising: a frame formed with a chamber having a viewing aperture; a resilient backing member disposed on said frame in a position opposite said aperture, the backing member being in the form of a truncated pyramid with the base being secured to the frame and the resiliency of the backing member providing for the flat of the pyramid to be movable into said chamber and exert a force for holding a picture therein and movable out of said chamber to relieve said force; a catch movable to open and close said chamber; and means to releasably lock said catch when in position to close said chamber including resilient means interconnecting the catch with the backing member, the resilient means exerting a force for engaging the wedge-shaped surface on the catch and on the frame.

8. A picture holder comprising: a frame formed with a chamber having a viewing aperture; a resilient backing member disposed on said frame in a position opposite said aperture, the backing member being in the form of a truncated pyramid with the base being secured to the frame and the resiliency of the backing member providing for the flat of the pyramid to be movable into said chamber and exert a force for holding a picture therein and movable out of said chamber to relieve said force.

References Cited in the file of this patent

UNITED STATES PATENTS

| 409,526 | Underhill | Aug. 20, 1889 |
| 442,023 | Dickinson | Dec. 2, 1890 |
| 774,694 | Post | Nov. 8, 1904 |
| 2,623,316 | Knox | Dec. 30, 1952 |
| 2,651,867 | Prew | Sept. 15, 1953 |